Dec. 8, 1964                J. R. SNYDER                3,160,700
                         INFRARED OPTICAL SYSTEM
Filed Aug. 18, 1961                                3 Sheets-Sheet 1

INVENTOR.
JOHN R. SNYDER
BY
ATTORNEY.

Dec. 8, 1964  J. R. SNYDER  3,160,700
INFRARED OPTICAL SYSTEM

Filed Aug. 18, 1961  3 Sheets-Sheet 2

INVENTOR.
JOHN R. SNYDER

BY
*P. H. Fursht*
ATTORNEY.

United States Patent Office 3,160,700
Patented Dec. 8, 1964

3,160,700
INFRARED OPTICAL SYSTEM
John R. Snyder, China Lake, Calif., assignor to the United States of America as represented by the Secretary of the Navy
Filed Aug. 18, 1961, Ser. No. 132,512
2 Claims. (Cl. 88—57)
(Granted under Title 35, U.S. Code (1952), sec. 266)

The invention herein described may be manufactured and used by or for the Government of the United States of America for governmental purposes without the payment of any royalties thereon or therefor.

The present invention relates to a lens configuration, and in particular to a multiple-element lens system having special use in the infrared region.

In the field of infrared refracting optics has, for the most part, been given little attention. Accordingly, a single element with an aspheric surface is used when the wavelength region is small or when necessity forces the user to tolerate the large variation in focal point with wavelength. Recent improvements in manufacture have yielded infrared transmitting materials in much larger sizes with greatly enhanced physical and chemical properties, widening the possibilities for infrared developments.

Rapid progress in the field of solid-state physics has included the production of commercially available cells capable of detecting infrared radiation up to wavelengths of 14 microns. It is therefore necessary and desirable that lenses be made available to function efficiently in this region. The design of the lens system of the present invention which is corrected for use in the intermediate and far-infrared regions solves one of the difficulties encountered in the field of infrared detection and imaging.

An object of this invention is to provide a lens system that is corrected for use in the intermediate and far-infrared regions.

Another object is to provide a refractory optical system astigmatically corrected for a field of forty degrees and covering the infrared region of the spectrum from 2.3 microns to 11.0 microns.

It is a further object of the present invention to provide a system which achieves correction over a spectral range and angular field not heretofore available in lens refracting systems.

The exact nature of this invention as well as other objects and advantages thereof will be readily apparent from consideration of the following specification relating to the annexed drawings in which.

Figures 1, 2:
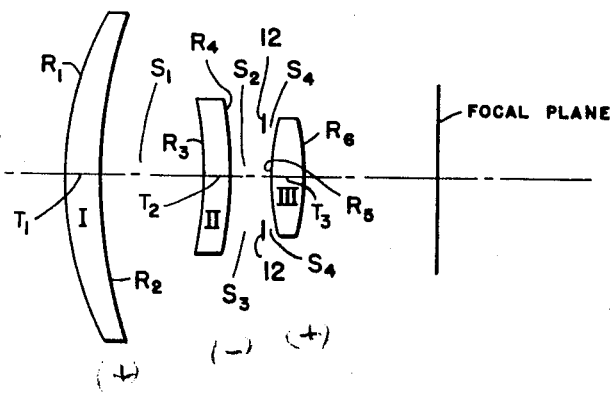
Fig. 1 is an illustrative embodiment in accordance with the invention having an aperture of $f/2$ for wavelengths in infrared.
Fig. 2 is a graph illustrating the back focal length as a function of the wavelength of light of the lens system of Fig. 1.

Referring more specifically to the drawings, Fig. 1 shows as an illustrative embodiment of the present invention a triplet lens with a relative aperture of $f/2.0$. It comprises three axially aligned optical elements or components I, II, and III, each separated by an air space. Each element is transparent to wave lengths of light in the infrared and substantially opaque to visible light. In the direction from the object space to the image space, or from front to rear, the first component I is a positive silicon element of meniscus form with its surface of shorter radius of curvature $R_1$, lying adjacent to the object space and that of longer radius of curvature $R_2$, bounding the lens air space $S_1$. The second component II is a negative arsenic trisulfide element of meniscus form with its surface or shorter radius of curvature $R_3$, bounding in part air space $S_1$ and that of longer radius $R_4$ bounding in part air space $S_2$. The third component III is a positive silicon double convex element with its radius $R_5$, lying substantially adjacent to the radius of less curvature $R_4$ of element II and bounding in part air space $S_2$, and its radius $R_6$ lying adjacent to the image space. Interposed in the paths of the rays between components II and III is an interior stop or diaphragm 12. A part of the radius of less curvature $R_4$ of component II lying substantially adjacent to stop 12 forms air space $S_3$, and radius $R_5$ of component III lying substantially adjacent to stop 12 forms air space $S_4$.

The materials of the lens system of Fig. 1 are shown in Table I below:

Table I

| Lens | Material | Diameter (Inches) |
|---|---|---|
| I | Silicon | 2.550 |
| II | Arsenic trisulfide | 1.220 |
| III | Silicon | 0.900 |

Diameter stop .............................................. 0.618 inches.
$f$ ................................................................... 2.0 inches.
Field coverage ............................................ 40 degrees.
Spectral range ............................................ 2.7–11.0$a$ The specifications of the lens system of Fig. 1 are shown in Table II below:

Table II
[$f/2$]

| Lens | N | V | ΔN | Radii (Inches) | Lens Thickness (Inches) | Air Space (Inches) |
|---|---|---|---|---|---|---|
| I | 3.4195 (6.5$\mu$) | 132.94 | .0182 (2.7–11.0$\mu$) | $R_1=+2.498$<br>$R_2=+3.653$ | $T_1=0.267$ | $S_1(R_2 \rightarrow R_3)=0.820$ |
| II | 2.3964 (6.5$\mu$) | 29.09 | .0480 (2.7–11.0$\mu$) | $R_3=-2.732$<br>$R_4=-16.566$ | $T_2=0.140$ | $S_2(R_4 \rightarrow R_5)=0.427$<br>$S_3(R_4 \rightarrow \text{Stop})=0.352$<br>$S_4(\text{Stop} \rightarrow R_5)=0.075$ |
| III | 3.4195 (6.5$\mu$) | 132.94 | .0182 (2.7–11.0$\mu$) | $R_5=+5.412$<br>$R_6=-9.518$ | $T_3=0.160$ | |

In the above table and on the accompanying drawing $f$ refers to the focal length of the lens; the Roman numerals refer to the elements comprising the system numbered from the front of object space; N is the index of refraction calculated at 6.5 microns wavelength; $\Delta N$ is the dispersion; V is the reciprocal dispersive power; customarily defined as $(N_\lambda-1)$ $(N_{\lambda 2}-N_{\lambda 3})$ where the N's are the refractive indices at the wavelengths $\lambda_1$, $\lambda_2$ and $\lambda_3$; R is the radii of curvature of the refractive surfaces and the subscripts to these refer to the surfaces; T refers to the thicknesses of the elements and the subscripts refer to the elements in axial alignment from front to object space; S refers to the air spaces between the elements and the elements and the stop, and the subscripts refer to the spaces numbered consecutively from the front; the + signs in the radii column correspond to surfaces which are convex to the front.

The V-number for silicon and arsenic trisulfide is defined as $$V = \frac{N_{6.5\mu}-1}{N_{2.7\mu}-N_{11.0\mu}}$$

where the N's are the refractive indices at the corresponding wavelengths. In this manner, the V-numbers for silicon and arsenic trisulfide are calculated as 132.94 and 29.09, respectively.

The triplet element form of the present invention was chosen for the lens because the parameters are just sufficient to correct for all basic aberrations. The materials are silicon in the two positive elements and arsenic trisulfide in the single negative element. Germanium may be used as a material in the positive lens and possibly modified selenium would then be suitable for the single negative element. In the present case arsenic trisulfide is the only material whose index of refraction relates to that of silicon so as to result in a flat field condition and at the same time provide the necessary long wavelength transmission.

The infrared bandwidth covered by the present silicon-arsenic triplet system is approximately twenty times that of visible light lenses with the same secondary spectrum.

Figure 3:
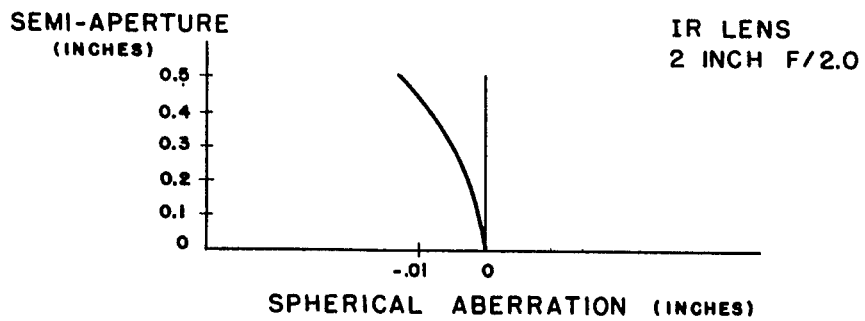
Fig. 3 is a graph illustrating spherical aberration of the lens system of Fig. 1.
Figure 4:
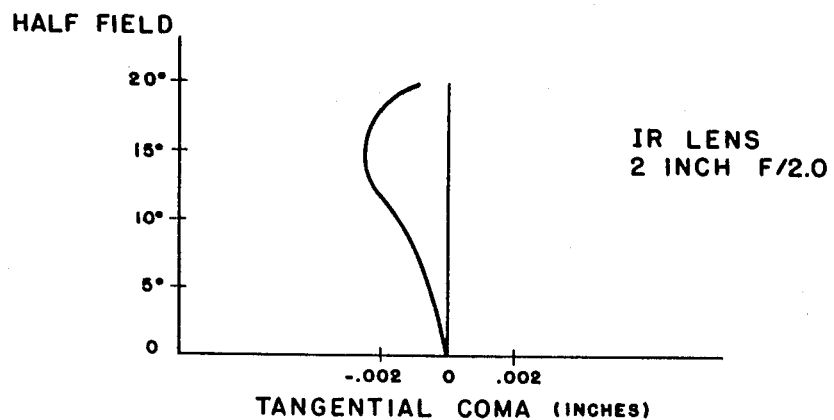
Fig. 4 is a graph showing the tangential coma of the lens system of Fig. 1.
Figure 5:
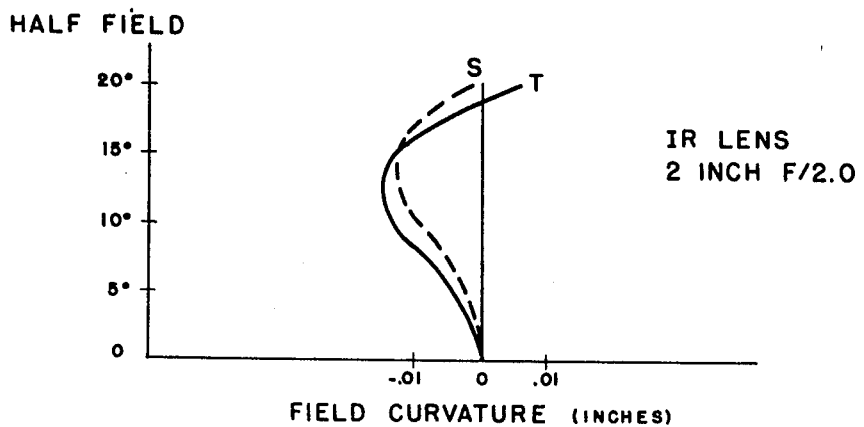
Fig. 5 is a graph showing field curvature of the lens system of Fig. 1.
Figure 6:
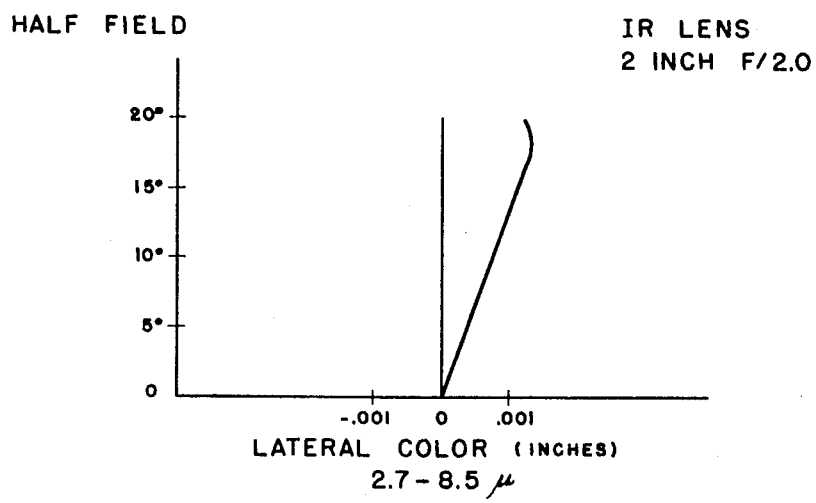
Fig. 6 is a graph showing lateral color in the lens system of Fig. 1.
Figure 7:
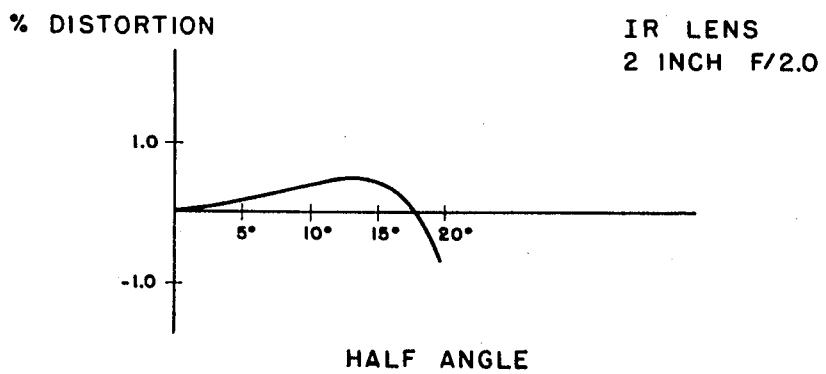
Fig. 7 is a graph showing distortion of the lens system of Fig. 1.

FIG. 1 illustrative of this invention shows that this lens system differs markedly from its visible-light counterpart from the standpoint of front-element diameter, element spacings, and stop position. In this invention the element spacings and stop position or diaphragm were used to control coma and astigmatism, as illustrated in the graphs of FIGS. 4 and 5, respectively. The present lens system corrects for astigmatism for a field of 40 degrees and covering the infrared region of the spectrum for about 2.3 microns to about 11.0 microns for relative aperture as large as $f/2.0$. Power ratios between the positive silicon lenses and the arsenic trisulfide lens were used to flatten the field and correct for variation in focal point with wavelength. The diameter of the front lens was used to minimize vignetting. No control existed over the secondary spectrum as is illustrated in FIG. 2, and only partial control existed over the spherical aberration as is illustrated by the graph of FIG. 3. FIGS. 6 and 7 illustrate that lateral color and distortion are well corrected by the lens system of this invention.

It is to be understood that the above-described arrangement is illustrative of the principles of the invention. Other such arrangements can be devised by one skilled in the art without departing from the spirit and scope of the invention as set forth in the appended claims.

What is claimed is:

1. A lens system substantially as specified in the following table:

[$f/2$]

| Lens | Radii (Inches) | Lens Thickness (Inches) | Air Space (Inches) |
|---|---|---|---|
| I | $R_1=+2.498$ | $T_1=0.267$ | |
| | $R_2=+3.653$ | | $S_1(R_2 \to R_3)=0.820$ |
| II | $R_3=-2.732$ | $T_2=0.140$ | |
| | $R_4=-16.566$ | | $S_2(R_4 \to R_5)=0.427$ |
| | | | $S_3(R_4 \to Stop)=0.352$ |
| III | $R_5=+5.412$ | $T_3=0.160$ | |
| | $R_6=-9.518$ | | $S_4(Stop \to R_5)=0.075$ | where the first column gives the lens elements in Roman numerals in order from the front, of which element I is of silicon, element II is of arsenic trisulfide and element III is of silicon; R, T and S refer respectively to the radii of curvature of the refractive surfaces, the thickness of the elements, and the air space between the elements; the elements, radii and the spaces being numbered consecutively from the front, $f$ is the focal length of the lens and the + signs correspond to surfaces which are convex to the front.

2. An objective lens system substantially as specified in the following table:

[$f/2$]

| Lens | N | V | $\Delta N$ | Radii (Inches) | Lens Thickness (Inches) | Air Space (Inches) |
|---|---|---|---|---|---|---|
| I | 3.4195 (6.5$\mu$) | 132.94 | .0182 (2.7-11.0$\mu$) | $R_1=+2.498$ | $T_1=0.267$ | |
| | | | | $R_2=+3.653$ | | $S_1(R_2 \to R_3)=0.820$ |
| II | 2.3964 (6.5$\mu$) | 29.09 | .0480 (2.7-11.0$\mu$) | $R_3=-2.732$ | $T_2=0.140$ | |
| | | | | $R_4=-16.566$ | | $S_2(R_4 \to R_5)=0.427$ |
| | | | | | | $S_3(R_4 \to Stop)=0.352$ |
| III | 3.4195 (6.5$\mu$) | 132.94 | .0182 (2.7-11.0$\mu$) | $R_5=+5.412$ | $T_3=0.160$ | $S_4(Stop \to R_5)=0.075$ |
| | | | | $R_6=-9.518$ | | | in which $f$ refers to the focal length of the lens; the Roman numerals refer to the elements comprising the system numbered from the front of object space; N is the index of refraction calculated at 6.5 microns wavelength; $\Delta N$ is the dispersion; V is the reciprocal dispersive power; customarily defined as $(N_\lambda-1)$ $(N_{\lambda 2}-N_{\lambda 3})$ where the N's are the refractive indices at the wavelengths $\lambda_1$, $\lambda_2$ and $\lambda_3$; R is the radii of curvature of the refractive surfaces and the subscripts to these refer to the surfaces; T refers to the thicknesses of the elements and the subscripts refer to the elements in axial alignment from front to object space; S refers to the air spaces between the elements and the elements and the stop, and the subscripts refer to the spaces numbered consecutively from the front; the + signs in the radii column correspond to surfaces which are convex to the front.

(References on following page)

References Cited by the Examiner

UNITED STATES PATENTS 2,994,053  7/61  De Waard.
3,002,092  9/61  Cary ---------------- 88—57 X
3,007,051  10/61 Amara et al.

FOREIGN PATENTS 117,978  7/57  Russia.

JEWELL H. PEDERSEN, *Primary Examiner*
EMIL G. ANDERSON, *Examiner.*